Feb. 27, 1962 G. W. LAWSON ET AL 3,022,668
EXHAUST GAS THERMOMETER
Filed Nov. 15, 1957
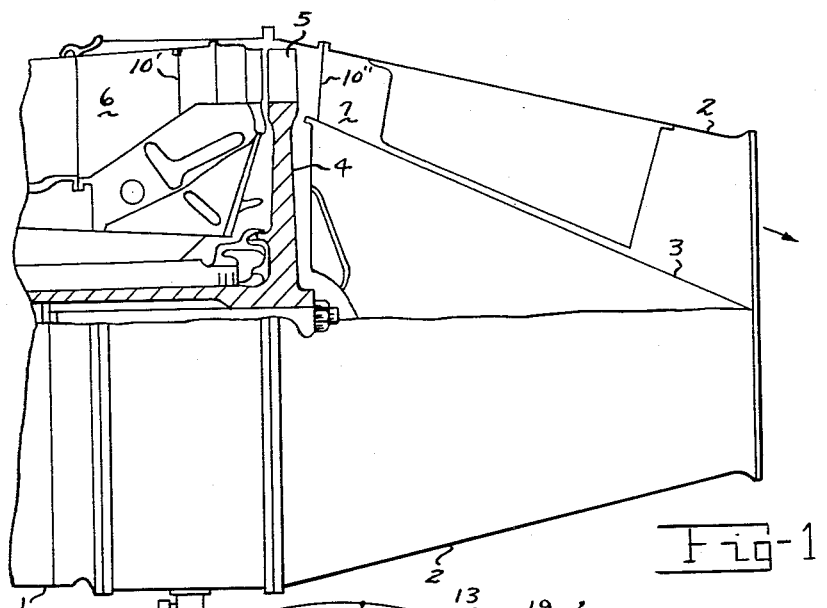
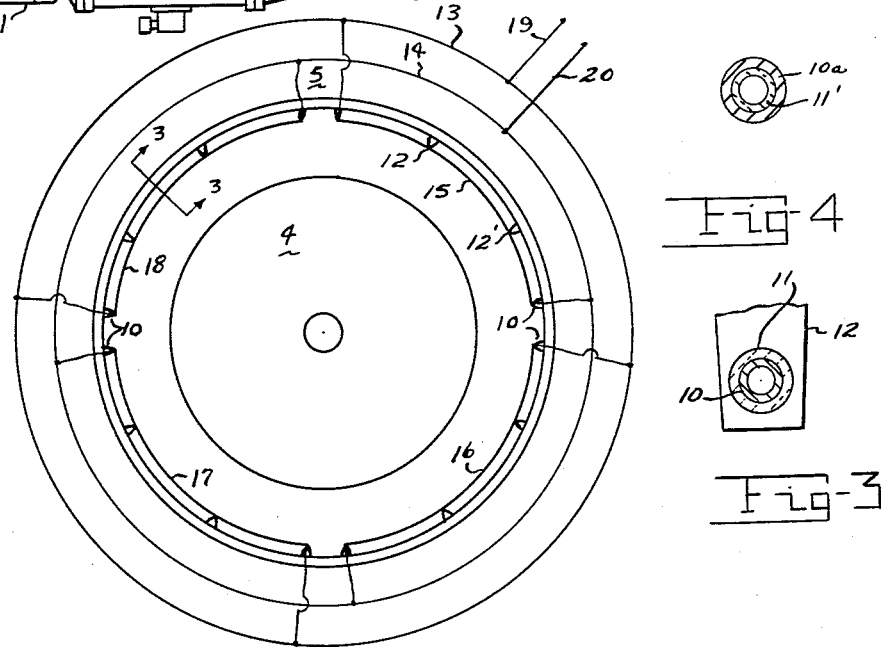
INVENTORS
GERALD W. LAWSON
ANTHONY J. ARRIGO
BY
ATTORNEYS

United States Patent Office 3,022,668
Patented Feb. 27, 1962

3,022,668
EXHAUST GAS THERMOMETER
Gerald W. Lawson, Lynnfield Center, Mass., and Anthony J. Arrigo, Lyndhurst, N.J., assignors to the United States of America as represented by the Secretary of the Air Force
Filed Nov. 15, 1957, Ser. No. 696,890
4 Claims. (Cl. 7—342)

This invention pertains to a resistance type of thermometer, read as a leg in a Wheatstone bridge, and more particularly to an improved thermometer for indicating mean temperatures in exhaust gas from jet engines and the like.

The problem solved by the present invention pertains to difficulties encountered in attempting to measure temperatures in turbojet exhaust gases. The performance and the endurance of turbojet engines are materially affected by the temperature of the engine exhaust gases and hence the temperatures of these gases is a matter of importance. It is known that, due to the nature of turbojet engines, pulsating temperature gradients exist in the gas flow, both before and after the turbine of the engine. For the most accurate indication and control of the engine's performance these pulsating temperature gradients must be averaged out and preferably by a single temperature indicating instrument. Illustratively, a plurality of thermocouples were positioned strategically about the engine exhaust gas conducting and discharge compartments and the thermocouple outputs were applied to a single instrument for averaging them out as a single series of readings. Where a plurality of thermocouples were used differences appeared in the temperatures indicated thereby. The mounting and the use of increasing numbers of the best thermocouples available have been used in efforts to acquire improved data, in approaching the data provided by the invention which is disclosed herein.

A brief summary of the invention follows, indicating its nature and substance together with a statement of the object of the invention commensurate and consistent with the invention as claimed and also setting out the exact nature, the operation and the essence of the invention complete with proportions and techniques that are necessary with its use. The purpose of the invention also is stipulated. The presentation is adequate for any person who is skilled in the art and science to which the invention pertains to use it without involving extensive experimentation. The best mode of carrying out the invention is presented by the citing of a specific operative example inclusive of the preparation and the use of at least one example of the invention.

The present invention embodies the natural property of metals of changes in resistance to the flow of electrical current with changes in temperature. This invention provides a desired plurality of arcuate hollow tube segments mounted at a desired proximity to a heat source. A first collector wire connects one end of the segments to a first harness wire. A second collector wire connects the other end of the segments to a second harness wire. The harness wires connect with a temperature indicating instrument and, for example a leg of a Wheatstone bridge circuit that preferably reads directly in degrees of temperature. An object of the invention is to improve the dependability of temperature readings in jet engine tail cone, exhaust gas.

An illustrative installation of the present invention is represented in the accompanying drawing wherein:

FIG. 1 is a partly diagrammatic and partly fragmentary side elevational view, partly broken away and in section, of a turbine, a tail pipe, and a tail cone of a jet engine with the present invention indicated as mounted therein;

FIG. 2 is a diagrammatic and elevational view, with the tail cone removed for clarity, taken from the right of FIG. 1;

FIG. 3 is an enlarged transverse section of an electrically conductive hollow tube taken at the line 3—3 of FIG. 2; and FIG. 4 is a modification of FIG. 3.

The jet engine fuselage fragment shown in the accompanying drawing comprises an aircraft fuselage 1 terminating toward the right rear in a tail pipe 2 within which are positioned a tail cone 3 and forwardly of the tail cone is a turbine wheel 4 carrying a plurality of turbine blades 5 along its periphery. Aircraft propulsion gases are ignited within the combustion chamber 6, flow past the turbine blades 5 from which they escape from the aircraft through an exhaust cone 7 between the tail cone 3 and the tail pipe 2.

The present invention consists of an electrically conductive cylindrical tubing 10, protectively coated against erosion by being covered with a ceramic surface layer 11. The hollow tubing, with its ceramic surface layer, preferably is positioned about along the path of the root of the turbine blades 5 as a substantially continuous annulus secured in place with supports 12, 12', etc. attached to the air frame. The annulus may be positioned within the ignition chamber 6 ahead of the turbine blades 5, as indicated at 10', or in a position indicated at 10'', of lower temperature behind the turbine blades. As a practical adaptation, the annulus is divided into a desired plurality of segments, such as the quadrants 15, 16, 17 and 18, preferably with their ends closely adjacent to, but insulated from, each other. A desired plurality of the electrically nonconducting insulated supports 12, 12', etc., attached to the air frame maintain each quadrant in place in the exhaust gas passage. Each ceramic coated conductor tube quadrant has one of its opposite ends connected to a first collector wire 13 and its other end connected to a second collector wire 14. Harness connector wires 19 and 20 connect the collector wires 13 and 14, respectively, as one leg in a Wheatstone bridge circuit, not shown, which is provided with a reading instrument preferably graduated directly in degrees of temperature. The segments are shown connected in parallel.

The described construction and connection cause temperature inequalities in the quadrants to be merged in a mean temperature at the bridge indicator instrument. This merged temperature is more realistic of the temperature exhaust gas than is a plurality of temperatures indicated by a corresponding plurality of individual thermocouples.

The plurality of tubular wires contemplated hereby serve as a temperature sensing means that functions as a temperature averaging device. The ceramic coated, tubular type of wire overcomes the limitations of solid cylindrical wire which experiences excessive changes in calibration after prolonged heating, represented experimentally by solid wire readings that begin at 1250° F. and after ten hours dropped to 1225° F. Cylindrical solid wires exhibit the further limitation of breaking under vibration tests. The hollow cylindrical wire contemplated hereby is sometimes termed in the laboratory hypodermic tubing since its dimensions are about that of a hypodermic needle.

The ceramic coating on the hollow tubular wire minimizes erosion in service and where not required for this function may be omitted within the scope of the present invention. The ceramic coated tubular wire maintains uniform calibration throughout its period of service and has been found to be of ample strength for its described adaptation to aircraft use. Laboratory tests of the ceramic coated tubular wire extend over 100 hours at 1600° F. with no failures and no change in calibration.

The present invention is the first practical equipment and method for measuring and for averaging gas temperatures in turbojets. The invention is equally applicable to other installations, subject to necessary modifications in the equipment and in its contour. The equipment and the method which are disclosed herein make practical the electrical controlling of after burners and of engine output.

A preferred modification in the invention is illustrated in FIG. 4 of the accompanying drawing, wherein the electrically conductive cylindrical tubular wire 10a is protectively coated against erosion by being covered on its inside with a ceramic surface layer 11' where the wire interior is exposed to the combustion gases. The tubular wire 10 and 10a is the electrical conductor independently of its coatings. The ends of the segment quadrants 15 to 18, inclusive, or other number of segments, may be sealed against the admission of hot combustion product gases inside the segments, if preferred. It will be apparent that direct contact between combustion product gases, or any other fluids for that matter, and the metal of the segments 15 to 18, inclusive, will provide optimum speed of response to changes of temperature therein. The composition of the tubing 10 and 10a is chosen for both its electrical characteristics and its resistance to any destructive action of the fluids to which it may be exposed. The tubing 10 and 10a and the coatings 11 and 11' may include cermet compositions within the scope of the present invention. It will be apparent that corrosion of the material of which the tubing 10 is made may require the recalibration of the equipment.

It is to be understood that the apparatus and the method disclosed herein have been submitted as being experimentally successful in a turbojet engine as an embodiment of the present invention and that similar modifications may be made therein without departing from the contemplated scope of the present invention.

What we claim is:

1. A device responsive to temperature changes in turbojet exhaust gases passing turbine blades and passing between the tail pipe and the tail cone of a turbojet aircraft having an air frame, the device comprising a plurality of segments of electrically conductive cylindrical tubing that collectively define a substantially continuous annulus exposed to the thermal effects of the turbojet exhaust gases, a plurality of supports mechanically securing the segments of cylindrical tubing to the air frame near the turbine blades of the turbojet, a first collector wire connected to a first end of each of the segments, a second collector wire connected to a second end of each of the segments, and a pair of electrically conducting harness connector wires connected respectively to the first and the second collector wires.

2. The device defined by the above claim 1 wherein the cylindrical tubing segments bear a ceramic coating protecting them from hot combustion product gases.

3. The device defined by the above claim 1 wherein the interior of the cylindrical tubing segments bear a protective ceramic coating and the exterior of the segments are exposed to combustion product gases for optimum speed of response to changes in the temperature thereof.

4. The device defined in the above claim 1 wherein the ends of the segments are sealed against the admission of hot combustion product gases inside the segments.

References Cited in the file of this patent

UNITED STATES PATENTS

| | | |
|---|---|---|
| 441,488 | Hensley et al. | Nov. 25, 1890 |
| 1,363,267 | Porter | Dec. 28, 1920 |
| 1,659,804 | Brown | Feb. 21, 1928 |
| 2,135,513 | Holven | Nov. 8, 1938 |
| 2,308,459 | Schwarzkopf | Jan. 12, 1943 |
| 2,357,473 | Jira | Sept. 5, 1944 |
| 2,412,462 | Marsten | Dec. 10, 1946 |
| 2,539,089 | Lear | Jan. 23, 1951 |
| 2,691,889 | Dion et al. | Oct. 19, 1954 |
| 2,698,872 | Broffitt | Jan. 4, 1955 |
| 2,875,613 | Neal | Mar. 3, 1959 |

FOREIGN PATENTS

| | | |
|---|---|---|
| 1,035,691 | France | Apr. 22, 1953 |
| 543,589 | Italy | May 22, 1956 |